Patented Jan. 15, 1952

2,582,500

UNITED STATES PATENT OFFICE 2,582,500

SURFACE COATING COMPOSITIONS CONTAINING ETHERS OF CATECHOL TYPE OF TANNING AGENT

Kenneth Potter Monroe, Boston, Mass., assignor to Standard Dyewood Company, Medford, Mass., a corporation of Massachusetts No Drawing. Application July 14, 1950, Serial No. 173,943

14 Claims. (Cl. 260—6)

The present invention relates to surface coating compositions containing new acidic synthetic resins.

In my copending applications, Serial Nos. 173,941 and 173,942 I have described a group of new acidic resins derived by chemical modification of natural polyhydroxy phenolic tanning materials. The said resins are in effect ethers of, or the methylol or polymethylene derivatives of the ethers of, natural polyhydroxy phenolic tanning materials, such as various tanning agents generally of the catechol type, which are exemplified by quebracho extract, wattle, cutch, mangrove, etc. Generally speaking, the resins are produced on the one hand by the sequential etherification of these types of tanning materials with, for example, monochloroacetic acid and then with an aralkyl halide, such as benzyl chloride, or, on the other hand, with methylol or polymethylene derivatives derived from the same raw materials but with an intermediate condensation step with an aldehyde such as formaldehyde.

These resins are characterized by the presence of free acidic groups which render them, because of the nature of their constitution, far more powerful an acid than the natural acidic resins such as those derived from ordinary rosin or abietic acid. For this reason coating compositions involving the use of these novel synthetic acidic resins have many improved properties, all as will be further detailed hereinbelow.

It is one of the objects of the present invention to produce coating compositions containing alcohol-soluble proteins and the aforementioned acidic synthetic resins.

It is a further object of the invention to produce coating compositions consisting of various formulations involving the use of such proteins as zein and the synthetic acidic resins.

Further objects of the present invention will become manifest from the further description hereinbelow and the hereunto appended claims.

For example, a useful formulation for application to surfaces, particularly rigid surfaces such as wood, is derived substantially as follows:

100 parts of a synthetic resin derived from quebracho, namely quebracho-monocarboxy-alkyl dibenzylether, together with
100 parts of zein, which is an alcohol-soluble protein derived from corn, and
60 parts of "Santicizer No. 8," which is a mixture of ortho and para toluene ethyl sulfonamides, which is in the form of a light amber liquid, (for a further description thereof, see page 562 of Condensed Chemical Dictionary, Third Edition, 1942, published by Reinhold Publishing Corporation).

Instead of using the resin mentioned in the above formula, I may substitute the quebracho dicarboxy-alkyl-monobenzyl ether; or resins which are the methylol and polymethylene derivatives of either of these compounds. For details as to the making of these resins, I refer to my aforementioned two copending applications.

These above recited ingredients are shaken together with 300 parts of methanol at room temperature until a homogeneous solution of the zein resinate, together with the resinate of the toluene ethyl sulfonamide, is obtained. This solution may be thinned down to any desired consistency for brush or spray-gun application with various combinations of organic solvents of which, for example, a mixture of equal parts by volume of methanol and toluene is effective. The application of such a suitably thinned solution of the above constituents to a surface such as wood, for example, results in a clear, lustrous, and very rapidly drying surface coating. Chemically this film probably consists of various polymers derived from various combinations of zein resinate and the toluene sulfonamide resinate, such mixed resinate molecules building up to various degrees of molecular complexity. This surface coating has the desirable property, from the viewpoint of the user, of not only being relatively quick drying and yielding a clear and highly lustrous film, bringing out the grain characteristics of the wood, but it is also tough and resilient and has a relatively short drying time (for example 30 minutes), and yields a film tough enough to withstand the customary abrasive action of sandpaper and steel wool prior to the application of the next coat. After this relatively short drying period and the customary sandpapering or abrasive action of the steel wool, the second coat may be similarly applied, either by brushing or spraying, or by other conventional methods of application, with an intervening drying period before the application of the next succeeding coat.

Another desirable property of my protein resinates is that what is known in the jargon of the varnish trade as the "build up" is excellent. This means simply that the solution of a protein resinate as described above has relatively little tendency to penetrate deeply into the pores of the wood, which would be undesirable, but it does very rapidly and efficiently anchor itself into the wood at the desired depth, yielding a very tough, very adherent, and a highly lustrous film after the relatively short period of time which is required for the solvent to evaporate.

It is obvious that these protein resinate solutions may be further modified in many other desired ways well known to the trade, as for example by the incorporation of organic or inorganic pigments, other synthetic resins, elastomers (such as for example butadiene acrylonitrile copolymers) or other modifying agents which are compatible with the protein resinate solutions. Thus, predicated upon the fundamental hereinabove enumerated ingredients, the solution or coating compositions thus obtained may be blended with other known coating materials with which they are compatible. Examples of materials which have been found to be compatible with the zein reinstates, i. e., those resinates made with the synthetic resins described in my copending applications, are such synthetic elastomers as copolymers of butadiene and acrylonitrile, alkyd resins and oil-fatty-acid modified alkyd resins, oil-soluble phenolic resins, and other acidic natural resins, such as rosin, hydrogenated rosin, and alcohol-soluble drying oils, for example dehydrated castor oil.

These protein resinate solutions may be applied by brushing, spraying, or by other conventional methods usually employed by those skilled in the art.

The acidic resins described in my copending applications Serial Nos. 173,941 and 173,942 may be readily "cut" or dissolved in aqueous media by the use of alkaline reagents such as ordinary ammonia, borax (sodium tetraborate), morpholine, and by many other such alkaline reagents. This method, of course, has been applied to natural acidic resinous substances, such as shellac, for example, and is known as "cutting." Such "cut" aqueous solutions of shellac have been used for many years in compounding finishes for leather, there usually being added in addition to the shellac other components such as, for example, alkaline-cut casein, wax emulsions, and pigments of various kinds. In addition latices of certain synthetic elastomers (such as butadiene acrylonitrile copolymers) may be used. It is customary in applying a leather finish to either brush, spray, or "swab" the aqueous finish onto the surface of the leather, where it leaves a smooth, adherent, lustrous film on evaporation of the water. As the water evaporates the volatile alkali, such as ammonia or morpholine, also volatilizes, thereby dissociating the original ammonium or morpholine salt of the acidic resin. During evaporation of the aqueous medium containing protein resinates derived from my synthetic acidic resins, there are formed, in the film, protein resinates which have properties more desirable than are those of the corresponding films derived when the finish contains protein resinates derived from previously known acidic resins, such as ordinary rosin, for example. The film derived from the protein resinates of my synthetic acidic resins is also markedly more flexible and more highly lustrous than the corresponding films derived from protein resinates of previously known acidic resins such as ordinary rosin, for example.

In making up an aqueously dispersed solution predicated upon the present invention, one may dissolve, for instance:

25 parts of the above mentioned acidic resin by weight,
25 parts of an alkaline-dispersible protein which may be either of animal origin, such as casein, or vegetable origin, such as soybean protein, gliadin, zein, or the like, and
12 parts of an alkali, such as ammonium hydroxide and
325 parts of water.

Preferably the resin and the protein are mixed with water and stirred until a uniform suspension has been formed, whereafter sufficient amounts of the alkali are added to dissolve both the resin and the protein, the mixture being stirred until a homogeneous dispersion has been formed. When this has been properly done the solution will be uniform and nonsettling, due to the, at least, colloidal solution of the constituents. In applying a solution of this type the setting of the film is accomplished primarily by evaporation of the water and the dissipation of the volatile alkali. When using a nonvolatile alkali, such as borax or trisodium phosphate, the residual potential solvent will remain in the film which would then be potentially re-dissolvable by water alone. However, when using the volatile alkalies, such as ammonium hydroxide or morpholine, the dissipation of these renders the film water-resistant. Such solutions can, therefore, be used very much in the manner of the well known shellac sizes of the prior art, for which they form an excellent substitute which, in effect, is far superior to ordinary shellac.

Natural shellac usually contains a certain amount of a wax, which, for some purposes is deemed undesirable, but for the purposes of making coating compositions is useful in that it improves the water-resistance of the coating. As my new synthetic resins are devoid of any waxy components, I may also formulate coating compositions therewith which contain wax, for which purpose I have found particularly desirable a certain South American wax which strongly resembles carnauba wax in properties, and which is derived from Paraguayan sources, being sold under the Trade Mark "Caranda" wax. For all intents and purposes this "Caranda" wax may be substituted for and by, carnauba wax, as it has about the same characteristics. A formula containing such a wax may have the following constitution (all parts by weight):

113 parts of one of my monocarboxy-alkyl-dibenzyl resins made with two mols of formaldehyde
67 parts of "Santicizer #8"
30 parts "Caranda" wax
300 parts methanol
100 parts toluene The toluene in the above formula greatly aids in assuring the proper solution of the wax, and the blending of the ingredients.

It is also possible to produce a coating based only upon the new synthetic resins and the Santicizer No. 8, leaving out the "Caranda" wax and the toluene, the proportions of materials otherwise remaining about the same.

A formula which contains both zein and the "Caranda" wax may be as follows (all parts by weight):

100 parts of any of my new synthetic quebracho resins
100 parts zein
60 parts "Santicizer No. 8"
24 parts "Caranda" wax The above ingredients are dissolved in 300 parts of methanol plus 100 parts of toluene.

When using the water-based compositions, which contain a protein such as casein or zein, etc., particularly when using ammonium hydroxide as a solvent, the material forms a viscous brown syrup-like composition which is perfectly stable, but which ordinarily would require dilution with sufficient water to give it the desired degree of brushability. The ultimate coating composition thus obtained has the desirable property of easy brushability and of "riding" on the surface of leather to which it is applied, but without excessive penetration (so-called "diving"). On accelerated drying, as by warm air (not over 100° C.), or at room temperature, it will dry overnight to a smooth, flexible, uniform, lustrous and highly adherent finish film, the odor of ammonia having by that time completely disappeared. Such a film will withstand what is known in this art as "plating," which signifies contacting with a hot iron, as is customary in the finishing of leather, this "plating," and rubbing, readily bringing out a desirable high luster and smoothness, but without diminishing the adhesion or flexibility of the film. The function of my new synthetic quebracho resins, is to operate as an "intermediary" between the prolamine or other protein and the leather, securing adhesion and promoting luster.

For instance, my monocarboxy-alkyl-dibenzyl resins are markedly more lustrous and flexible, and characterized by freedom from cracking and checking under mechanical stress than are corresponding finishes compounded from some prolamines with natural shellac, and hence the coating compositions of the present invention represent a marked advance in this art.

In order to avoid the necessity for referring to my aforementioned co-pending applications which describe these new acidic resins, insofar as an understanding of the nature of the resins used in connection with the present invention is concerned, it might be stated that the catechol types of tanning agents, and particularly those derived from quebracho, contain a group which may be generalized as stating that it consists of two benzene rings joined by an intermediate non-benzenoid ring, with one or more hydroxyl groups attached to the benzene rings, and another hydroxyl group attached to the intermediate ring. The latter group is, however, quite unreactive. The hydroxyl groups attached to the benzene (phenolic) rings are readily etherified, and it is possible to prepare monocarboxy-alkyl diaralkyl ethers, or dicarboxy-alkyl mono-aralkyl ethers by the techniques described in said co-pending applications. Thus one might illustrate the structure of the active component of the catechol types of resins by the following structural formula, to which I shall hereinafter refer by the generalized abbreviation "T." This formula is

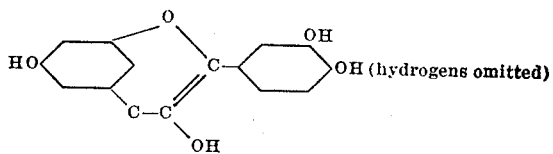

"T" may therefore also be defined as a "polyhydroxy phenolic major constituent of quebracho tannin, where each molecular unit contains two six-membered aromatic rings of carbon atoms, linked together by a heterocyclic ring of carbon and oxygen atoms, and where each molecular unit holds at least three phenolic hydroxyl groups, although these phenolic hydroxyl groups need not be, and usually are not, attached to the same six-membered aromatic ring of carbon atoms." Therefore, defining the essential constituents of the quebracho, or similar type of tannin, as

there could be compounds such as could be exemplified by

or

in which R represents a carboxy-alkyl radical and R' represents an "aralkyl" radical. These are the types of resins disclosed in my co-pending application Serial No. 173,941, while their methylol and polymethylene condensation products are described in my co-pending application Serial No. 173,942, and which latter comprise the products obtained by interposing a condensation with formaldehyde between the formation of the carboxy-alkyl ethers and the final aralkyl ethers. There would thus be a $CH_2$ group between each set of "T" complexes.

In the hereunto appended claims I am using the terms monocarboxy-alkyl diaralkyl and dicarboxy-alkyl mono-aralkyl to differentiate between these two kinds of acidic resins of the first type, and the general expression "an aralkyl ether of a formaldehyde condensation product of a carboxy-alkyl ether of a member of the group of catechol type of tanning agents, one to two of the phenolic hydroxyl groups of said tanning agent being etherified by aralkyl radicals and the remaining phenolic hydroxyl groups being etherified by carboxy-alkyl radicals, the latter containing two to three carbon atoms" for the resins of the second type. Both types lend themselves very well to the formulation of the coating compositions disclosed and claimed in the present application.

The instrumentalities for the making up of these solutions are so well known as not to require any illustration or drawing, as ordinary vats or tanks provided with adequate agitating means suffice for the production of the solutions or dispersions. If desired they can be clarified prior to use either by filtration or by high speed centrifugalization.

I claim:

1. A coating composition comprising a solution of substantially equal parts by weight of a carboxy-alkyl benzyl ether of a catechol type of tannin and an alcohol-soluble prolamine, dissolved in substantially one and one-half parts of an alcohol.

2. A coating composition consisting of substantially equal parts by weight of a carboxyl-alkyl benzyl ether of a catechol type of tannin and an alcohol-soluble prolamine dissolved in an alkaline reacting aqueous medium.

3. The composition of claim 2 in which the alkaline reacting medium contains ammonium hydroxide.

4. The composition of claim 2 in which the alkaline reacting medium contains borax.

5. A coating composition as defined in claim 10 in which the said ethers are the monocarboxy-alkyl diaralkyl ethers of said tannin.

6. A coating composition as defined in claim 10 in which the said ethers are the dicarboxy-alkyl mono-aralkyl ethers of said tannin.

7. A coating composition comprising a solution of a monocarboxy-alkyl dibenzyl ether of quebracho tannin and zein.

8. A coating composition comprising a solution of a dicarboxy-alkyl monobenzyl ether of quebracho tannin and zein.

9. A coating composition comprising about 113 parts of the dibenzyl ether of a formaldehyde condensation product of a mono-carboxy-alkyl ether of quebracho tannin, about 67 parts of a mixture of ortho- and para-toluene ethyl sulfonamides, about 30 parts of a Paraguayan wax of the carnauba type, about 300 parts of methanol, and about 100 parts of toluene, all by weight.

10. A coating composition comprising a solution of an acid resin from the group consisting of the carboxy-alkyl aralkyl ethers of a catechol type of tanning agent and of the aralkyl ethers of a formaldehyde condensation product of a carboxy-alkyl ether of said tanning agent, one to two of the phenolic hydroxyl groups of said tanning agent being etherified by an aralkyl radical and the remaining phenolic hydroxyl groups being etherified by carboxy-alkyl radicals which contain two to three carbon atoms, and a Paraguayan wax of the carnauba type.

11. A coating composition comprising a solution of an acid resin from the group consisting of the carboxy-alkyl aralkyl ethers of a catechol type of tanning agent and of the aralkyl ethers of a formaldehyde condensation product of a carboxy-alkyl ether of said tanning agent, one to two of the phenolic hydroxyl groups of said tanning agent being etherified by an aralkyl radical and the remaining phenolic hydroxyl groups being etherified by carboxy-alkyl radicals which contain two to three carbon atoms, and a protein from the group consisting of the alkali-soluble and alcohol-soluble proteins.

12. A coating composition comprising a solution of an acid resin which is an aralkyl ether of a formaldehyde condensation product of a carboxy-alkyl ether of a member of the group of catechol type of tanning agents, one to two of the phenolic hydroxyl groups of said tanning agents being etherified by aralkyl radicals and the remaining hydroxyl groups being etherified by carboxy-alkyl radicals, the latter containing two to three carbon atoms, and a protein from the group consisting of the alkali-soluble and alcohol-soluble proteins.

13. A coating composition as defined in claim 12 in which the tanning agent is quebracho and the protein is zein.

14. A coating composition as defined in claim 12 also containing a Paraguayan wax of the carnauba type.

KENNETH POTTER MONROE.

No references cited.